L. W. LILES.
WINDMILL.
APPLICATION FILED APR. 5, 1917.

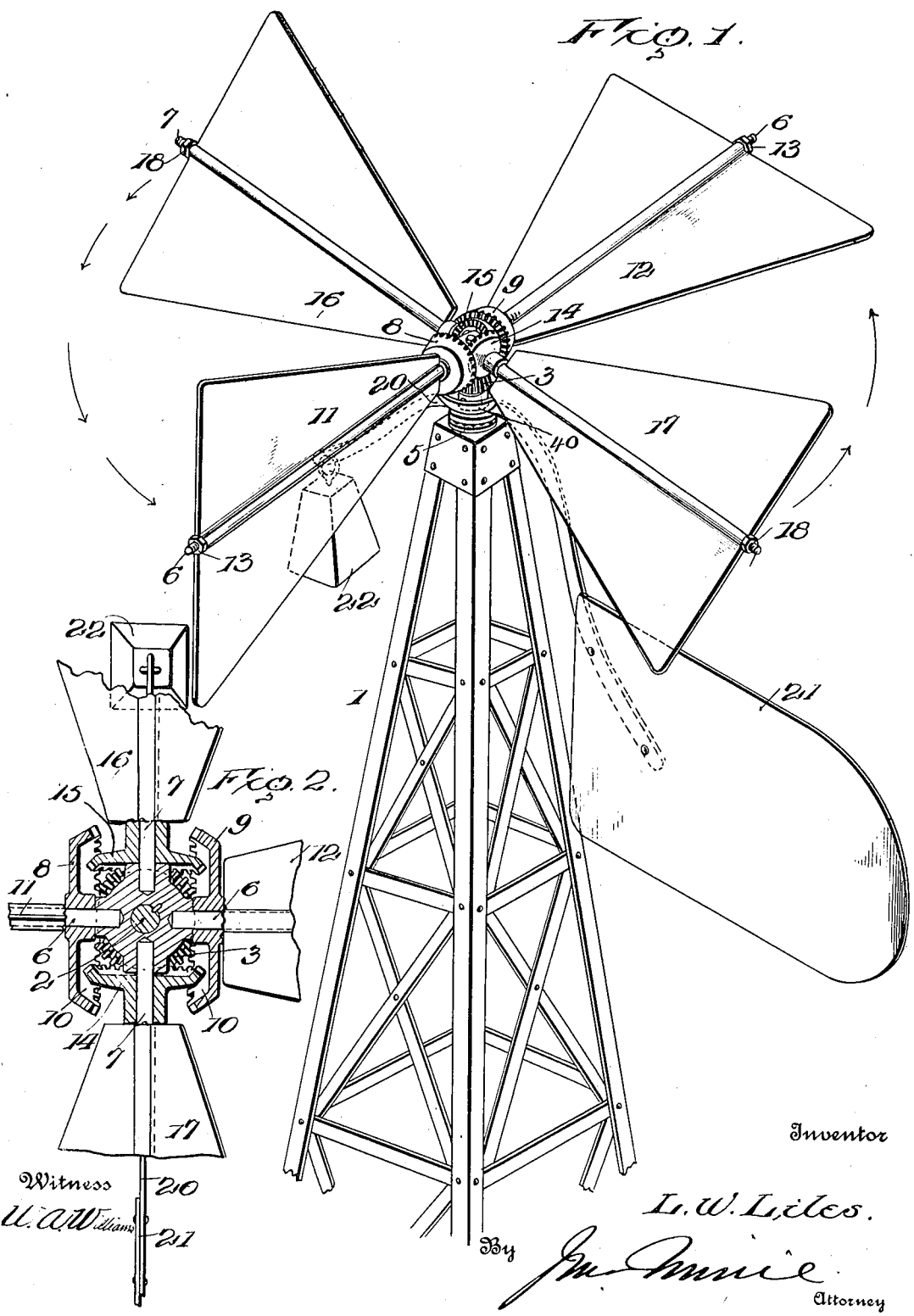

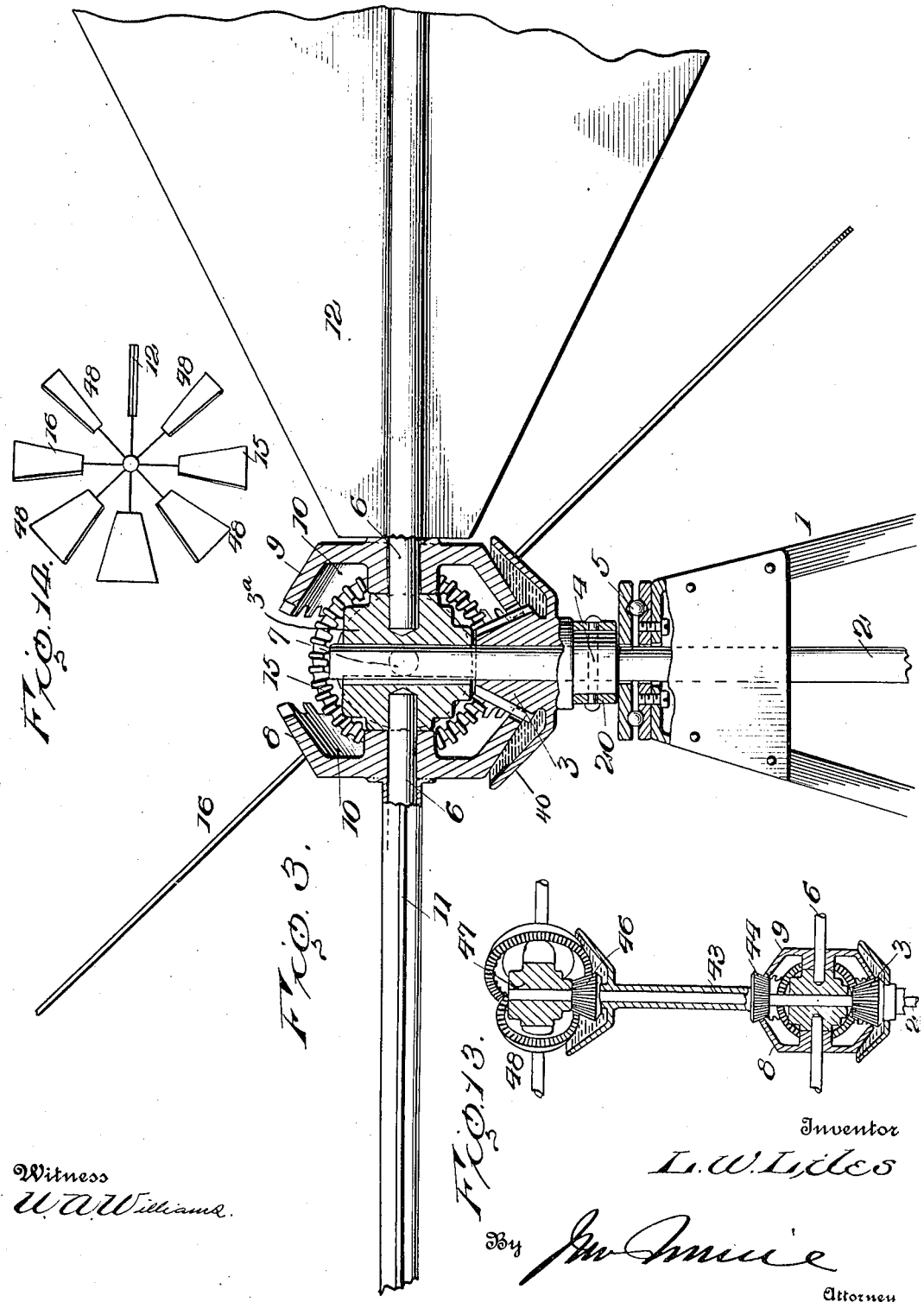

1,256,338.

Patented Feb. 12, 1918.
3 SHEETS—SHEET 3.

Witness
W. A. Williams.

Inventor
L. W. Liles
By
Attorney

UNITED STATES PATENT OFFICE.

LEANDER W. LILES, OF NACOGDOCHES, TEXAS.

WINDMILL.

1,256,338. Specification of Letters Patent. Patented Feb. 12, 1918.

Application filed April 5, 1917. Serial No. 159,940.

*To all whom it may concern:*

Be it known that I, LEANDER W. LILES, a citizen of the United States, residing at Nacogdoches, in the county of Nacogdoches and State of Texas, have invented certain new and useful Improvements in Windmills, of which the following is a specification.

This invention relates to improvements in wind mills.

The object of the invention is to provide in a wind mill, means for mounting the vanes in such manner that there will at all times be a vane surface substantially square with the wind, to receive the maximum force thereof, and means whereby each individual vane is rotated on its own axis one-half revolution in one complete revolution of the wind mill head.

A further object of the invention is to provide in a wind mill, means associated with gearing for rotating the vanes when the wind changes, to maintain the vanes in the same corresponding position at all times, with reference to the direction the wind is blowing.

The invention also comprehends improvements in the details of construction and arrangement of parts which will be hereinafter described and particularly pointed out in the appended claims.

In the accompanying drawings:

Figure 1 is a perspective view of my improved wind mill.

Fig. 2 is a detail central horizontal section taken through the mill head.

Fig. 3 is a detail vertical section of the same.

Fig. 13 is a central section of a different form of the invention.

Fig. 14 is a diagrammatic plan view of the same.

Figure 4:
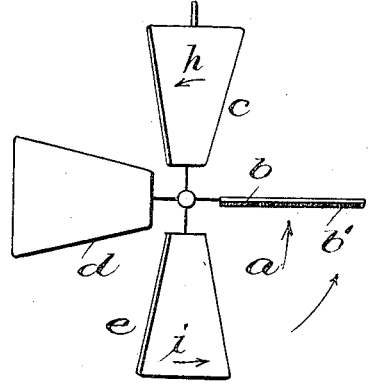
Figs. 4 to 12 are diagrammatic views showing the movement of the vanes.

The numeral 1 indicates a tower, through which extends a vertical shaft 2, suitably connected at its lower end to mechanism for pumping the water from a well (not shown). Near the upper end of the shaft 2, is loosely mounted an elongated pinion 3, having a hub 4, and between the latter, and a bearing plate on the top of the tower, are ball bearings 5. At the extreme upper end of the vertical shaft 2, is a head 3ª, from which extend four spindles 6 and 7 fixed to the shaft, the spindles 6 being in alinement with each other, while the spindles 7, which are also in alinement with each other, are at right angles to the spindles 6. Mounted on the spindles 6, are beveled gear wheels 8 and 9, which are hollow on their inner sides, as shown at 10, and each of which engages the opposite lower portion of the elongated pinion 3. Fixed to each pinion 8, and 9, are vanes 11 and 12, the vanes and pinions being held in proper position on the spindles by means of nuts 13, threaded on the ends of the spindles.

On the spindles 7, are mounted beveled pinions 14 and 15, which mesh with opposite sides of the upper portion of the elongated pinion 3, and which are housed in the hollow portion of the beveled gears 8 and 9. The pinions 14 and 15 mesh with the elongated pinion 3, at points at right angles to the point of meshing of the beveled gears 8 and 9, as clearly shown in the drawings. Fastened to and extending from each pinion 14 and 15, are vanes 16 and 17, which rotate on the spindles 7, and which are held in proper relation by nuts 18.

It is to be noted that the beveled gears 8 and 9 are larger in diameter than the beveled gears 14 and 15, but all the gears have the same number of teeth, and each rotates the same number of times in a definite period around the elongated pinion 3. The same number of revolutions of each of the gears around the pinion 3, although they are of different diameters, is due to the fact that, as stated, each is provided with the same number of teeth, and each meshes with the same teeth of the pinion in the course of rotation of the wind mill head. As the upper end of the pinion 3 is of less diameter than the lower end, obviously the smaller gears 14 and 15 will be rotated the same number of times in one revolution of the wind mill head as the gear wheels 8 and 9.

The vanes 11 and 12 are set at right angles to each other, so also are the vanes 16 and 17 set at right angles to each other. The vanes 11 and 12 are set at a quarter turn with reference to the vanes 16 and 17, so as to present one of the series of vanes square to the wind in each revolution of the wind mill head, as will presently appear.

Attached to the hub of the elongated pinion 3, is a yoke 20, which extends beyond each side of the shaft 2, and on its longer end it is provided with a tail vane 21, and at its shorter opposite end it is provided with a weight 22.

Referring to Figs. 4 to 12, which illustrate diagrams of the movement of the vanes, and assuming the wind to be blowing in the direction of the arrow A in Fig. 4, it will be seen that in two complete revolutions of the wind mill head, each vane will be rotated but once on its spindle.

Referring to Fig. 4, the vane $b$ is shown square to the wind to receive the maximum force of the wind blowing in the direction of the arrow $a$, while the vane $d$ is on edge and is shown as feathering the wind, and vane $c$ is shown on its eighth turn, and the vane $e$ is shown on its three-eighths turn, the vanes $c$ and $e$ rotating in the direction of the arrows $h$ and $i$.

Figure 5:
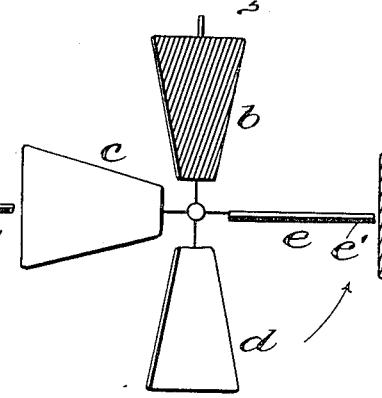
Figure 6:
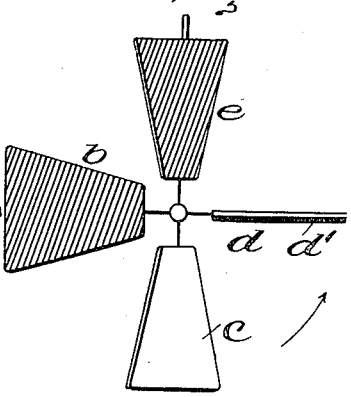
Figure 7:
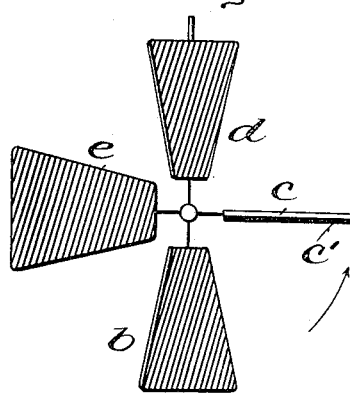
Figure 8:
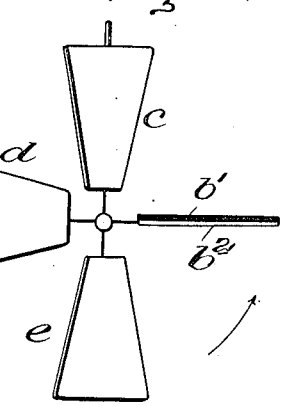

When the force of the wind strikes the black side $b'$ of the vane $b$, (Fig. 4) the mill head is rotated, Fig. 5 showing it in a quarter turn position. In this position the vanes have all been rotated on their spindles one-eighth of a revolution, and the vane $e$, having been positioned to receive the force of the wind. Upon the wind striking the black side $e'$ of the vane $e$ (Fig. 5) and the mill head being turned a quarter revolution, as shown in Fig. 6, the vanes are rotated on their respective spindles one-eighth revolution, the vane $b$, at this time having been rotated one-quarter revolution on its spindle, and the vane $d$, having been positioned to receive the force of the wind. When the wind strikes the black side $d'$ of the vane $d$ (Fig. 6) the mill head is rotated another quarter turn, and the vane $b$ is again brought square to the wind, but the opposite or white side $b^2$, is positioned to receive the force of the wind, as shown in Fig. 8.

During this entire movement (Figs. 4 to 8) it will be seen that the mill head has made one complete revolution, while the vane $b$ has made but one-half revolution on its spindle, the other vanes, of course, having been proportionately rotated on their respective spindles.

Figure 9:
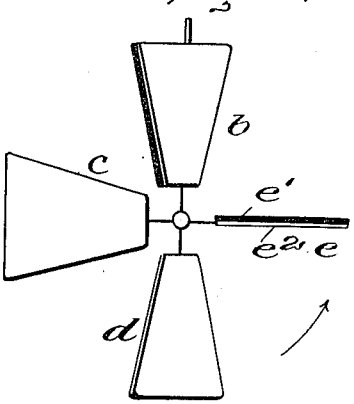
Figure 10:
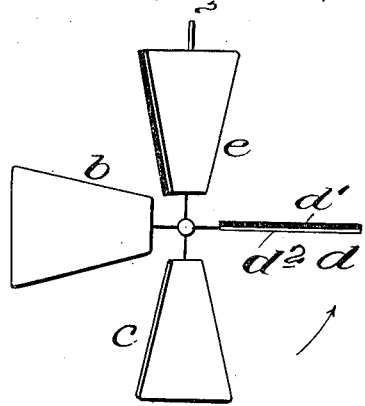
Figure 11:
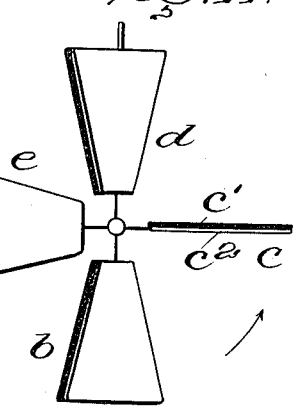

Assume the wind strikes the white side $b^2$, of the vane $b$, (Fig. 8) and turns the mill head one-quarter revolution, as shown in Fig. 9, the white side $e^2$, of the vane $e$, is positioned square to the wind. Now when the wind strikes the vane $e$ (Fig. 9) and turns the mill head a quarter revolution, the white side $d^2$, of the vane $d$, is brought square to the wind, as shown in Fig. 10. Upon the wind striking the vane $d$, (Fig. 10) and the mill head being rotated another quarter turn the white side $c^2$, of the vane $c$, is positioned square to the wind, as shown in Fig. 11. Now upon the wind striking the white side $c^2$, of the vane $c$, and rotating the mill head a quarter turn, the blade $b$ is brought square to the wind, as shown in Fig. 12.

Figure 12:
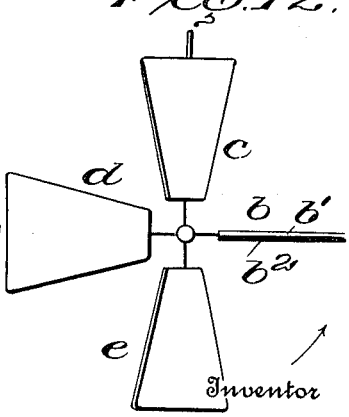

From the position shown in Fig. 4, to the position shown in Fig. 12, the mill head has made two complete revolutions, while the vane $b$ has made but one complete revolution, the other vanes, of course, having been proportionately rotated. During this period the wind acted on one side of the vane $b$ (indicated in the drawing as black) during the first revolution of the mill head, and on the opposite side of the vane (indicated as white in the drawing) during the second revolution of the mill head.

In the diagrams the opposite sides of the respective vanes, commencing with Fig. 4, have been shown as black and white, for the purpose of clearly illustrating the rotary motion of the respective vanes on their spindles, and to indicate clearly the fact that the wind acts on the opposite sides of the vanes in the two respective revolutions of the mill head.

Inasmuch as the tail vane is secured to the hub of the elongated pinion, when the wind shifts, it correspondingly shifts the tail vane which also rotates the pinion, which in turn rotates the several vanes on their respective spindles, consequently irrespective of the direction of the wind the vanes are at all times in the same relative position to the direction the wind is blowing, and to the tail vane. In any position of the mill head, there is always one vane that will be positioned square with the direction the wind is blowing, with the result that the maximum force and effect of the wind on the mill head is obtained.

Surrounding the elongated pinion 3, is a cup 40, to receive oil, which effectually lubricates the various gear teeth.

By extending the shaft 2, and mounting a sleeve 43 above the gearing described, eight vanes may be provided, as shown in Figs. 13 and 14. On the lower end of the sleeve 43, is a pinion 44, which meshes with the gears 8—9, and is rotated thereby, while at the upper end of the sleeve is a pinion 46. Secured to the upper end of the shaft is a support 47, from which extends four spindles, on each of which is a vane and gear wheel 48. of exactly the same construction and arrangement as that previously described, except that the upper set of vanes is disposed intermediate the vertical plane of the lower set, as indicated in Fig. 14.

The gear wheels 3, 44 and 46, are of the same diameter and the two sets of gears above and below the sleeve 43, are duplicates, that is the small gears are of the same diameter, and the large gears are of the same diameter. This construction will of course rotate the vanes of the upper set in a direction opposite to the direction of rotation of the vanes of the lower set.

The invention is extremely simple in construction, and because of the few moving parts, it is not liable to get out of order. The special arrangement of gearing is such that upon each complete revolution of the mill, the vanes are rotated on their spindles one-half revolution, so as to present the opposite sides thereof to the wind, and in addition to this function it permits the vanes to gradually feather to the wind, which greatly reduces the friction.

What I claim is:—

1. In a wind mill, the combination of a frame, a rotatable shaft in the frame, a plurality of spindles extending from the shaft, vanes loosely mounted on the spindles, a pinion loosely mounted on the shaft, gear wheels between the vanes and the pinion, the gears and pinions being proportioned to rotate each vane on its spindle one-half revolution upon each complete rotation of the mill head, and a tail vane secured to the pinion to change the position of the vanes to correspond to the change of direction of the wind.

2. In a wind mill, the combination of a frame, a rotatable shaft in the frame, a plurality of spindles extending from the shaft, vanes rotataby mounted on the spindles, an elongated pinion loosely mounted on the shaft, the oppositely disposed vanes having at their inner ends gear wheels which mesh with the elongated pinion and rotate around same, the gears and pinion being proportioned to rotate the vanes one-half revolution to one complete revolution of the mill, and a tail vane secured to the elongated pinion.

3. In a wind mill, the combination of a frame, a rotatable shaft in the frame, a plurality of spindles extending from the shaft, vanes rotatably mounted on the spindles, an elongated pinion loosely mounted on the shaft, the inner opposite ends of two oppositely disposed vanes having hollow gear wheels which mesh with the lower portion of the elongated pinion, the two other oppositely disposed vanes having gear wheels at their inner ends which are smaller in diameter than the first-mentioned gear wheels and are inclosed within the hollow portion thereof and which mesh with the upper portion of the elongated pinion, the gear wheels all having the same number of teeth, whereby to cause the vanes to rotate one-half revolution to one revolution of the mill, and a tail vane secured to the elongated pinion.

4. In a wind mill, the combination of a tower, a vertical shaft mounted in the tower, a beveled pinion loosely mounted on the shaft, a head secured on the shaft, fixed spindles extending outwardly from the fixed head, beveled pinions loosely mounted on the spindles and meshing with the beveled pinion on the shaft, said pinions being of different diameters but having the same number of teeth, vanes loosely mounted on the spindles and attached to the pinions on the spindles, all the pinions being proportioned to rotate the vanes one-half revolution to one complete revolution of the shaft, and a tail vane connected to the pinion on the shaft.

5. In a wind mill, the combination of a frame, a rotatable shaft in the frame, a plurality of spindles extending from the shaft, vanes loosely mounted on the spindles, a pinion loosely mounted on the shaft, oppositely disposed pairs of gears between the vanes and the pinion, the respective pairs of gears being of different diameters and all said gears being of larger diameter than the diameter of the pinion, the gears and pinion being proportioned to rotate each vane on its spindle one half revolution upon each complete rotation of the shaft, and a tail vane arranged to change the position of the vanes to correspond to the change of direction of the wind.

In testimony whereof I affix my signature in the presence of two witnesses.

LEANDER W. LILES.

Witnesses:
  MIRIAM STERN,
  JNO. IMIRIE.